July 7, 1925.

F. H. GROVE

TIRE CUTTER

Filed March 13, 1922

1,544,740

2 Sheets-Sheet 1

Inventor
Frank H. Grove
By Frease and Bond
Attorneys

Patented July 7, 1925.

1,544,740

UNITED STATES PATENT OFFICE.

FRANK H. GROVE, OF COLUMBIANA, OHIO.

TIRE CUTTER.

Application filed March 13, 1922. Serial No. 543,448.

*To all whom it may concern:*

Be it known that I, FRANK H. GROVE, a citizen of the United States, residing at Columbiana, in the county of Columbiana and State of Ohio, have invented certain new and useful Improvements in Tire Cutters, of which the following is a specification.

This invention relates to tire cutters and particularly to a machine for cutting sample sections from tire casings. It is customary for automobile manufacturers to provide a great number of sample sections of tires to their sales organization and the numerous departments of the factory, these sample sections being usually produced by cutting the same from stock tires.

To fulfill the purpose for which they are required, it is necessary that these sample sections be cut cleanly and accurately, and as great numbers of these sections are required in the normal operation of the tire manufacturing business, it is essential that accurate samples be produced with a minimum of time and expense.

The objects of the present invention are to provide a machine which will quickly and accurately cut sample sections from tires of various sizes.

The above and other objects may be attained by providing a construction such as illustrated in the accompanying drawings, in which—

Figure 1:
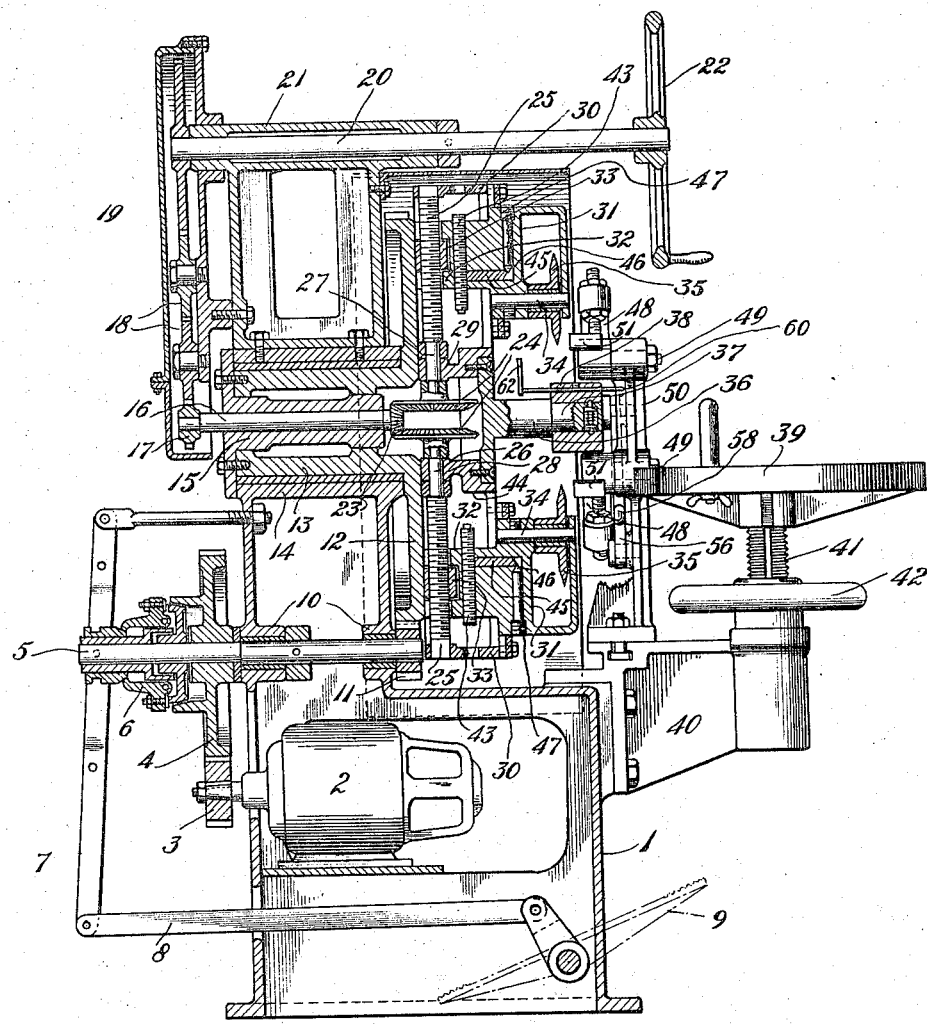
Figure 2:
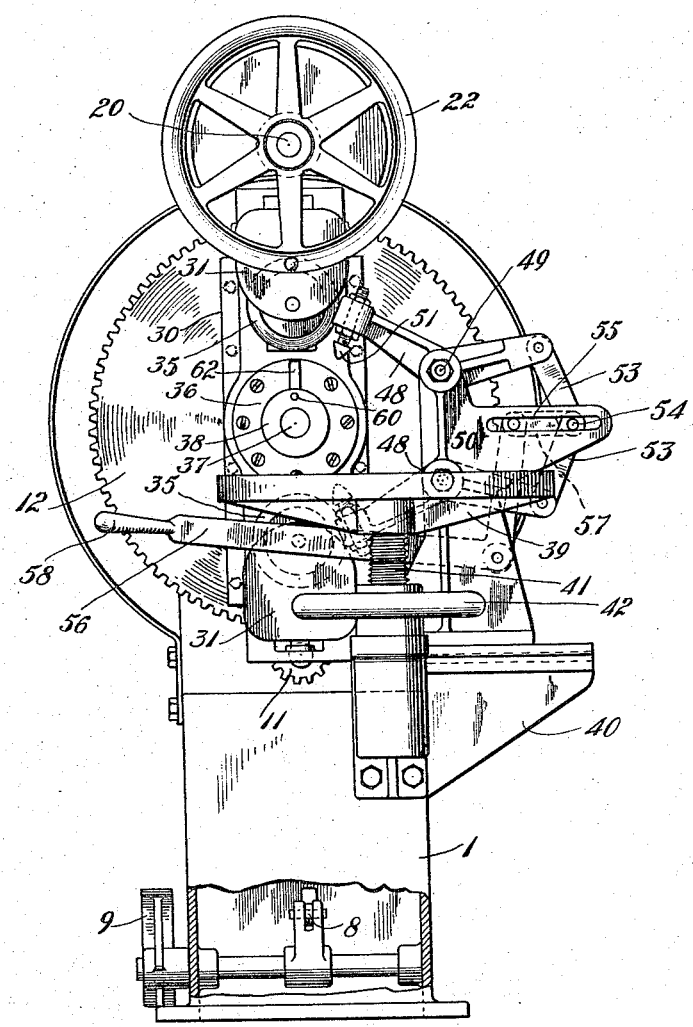

Figure 1 is a vertical, sectional view through a tire cutter embodying the invention;

Fig. 2, an end elevation of the same; and

Figure 3:
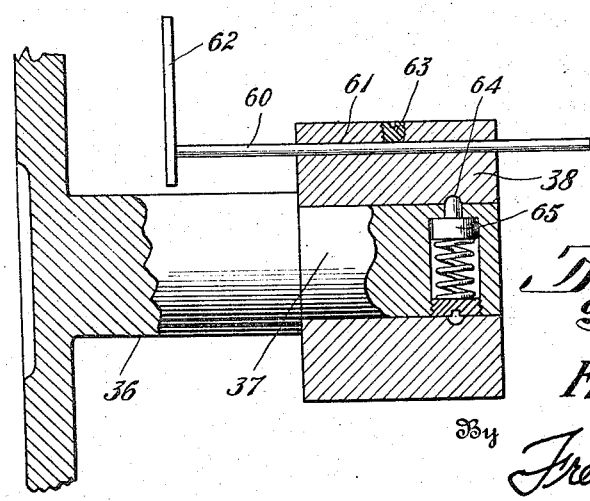

Fig. 3, an enlarged sectional view of the mandrel.

Similar numerals refer to similar parts throughout the drawings.

A housing is indicated at 1 adapted to contain a motor 2 upon the shaft of which is mounted a pinion 3 meshing with the gear 4 normally loosely mounted upon the drive shaft 5 and arranged to be fixedly connected thereto through the clutch 6 which is operated through the lever 7, link 8 and pedal 9.

The shaft 5 is journaled in bearings 10 formed in the housing 1 and carries the drive pinion 11 at its forward end. A large gear 12 meshes with the drive pinion 11 and is provided with the journal portion 13 journaled within the bearing 14 formed in the housing 1.

The journal 13 of this gear contains a concentric bearing 15 for the shaft 16 having in its rear end a pinion 17 operatively connected through a chain of gearing 18 with the gear 19 carried upon the shaft 20, which is journaled in the bearing 21 supported above the housing 1. A hand wheel 22 is fixed upon the forward end of the shaft 20 in a position to be grasped by the operator.

The forward end of the shaft 16 carries the bevel pinion 23 which meshes with the bevel gears 24 carried upon the inner extremities of the diametrically opposed screws 25. The screws 25 are provided with the journal portions 26 and 27 journaled in bearings 28 and 29 respectively, formed in a guide block 30 which is mounted upon the forward face of the gear 12.

A pair of slidable blocks 31 are mounted in the guide block 30, a bifurcated portion 32 upon each of said blocks receiving a nut 33 upon the adjacent screw 25. Each of the blocks 31 is provided with a spindle 34 upon which is loosely mounted a cutting disk 35.

A mandrel 36 is concentrically mounted upon the guide block 30 and provided with the reduced shank 37 adapted to receive a collar 38 which may be varied in size to accommodate various sizes of tires.

A work table 39 which supports the tire to be cut is mounted upon a bracket 40 carried by the housing 1, and arranged to be adjusted vertically for cutting tires of different sizes by means of the screw 41 and hand wheel 42.

A limit stop is provided for limiting the inward movement of the blocks 31 which carry the disk cutters and this is preferably in the form of a screw 43 arranged to contact with the annular shoulder 44 of the guide block. For the purpose of locking this screw in the desired position, a locking plate 45 is mounted within a recess in the block and arranged to be forced against the screw by the conical end 46 of the locking screw 47.

For the purpose of holding the tire rigid upon the mandrel during the cutting operation, a clamping device is provided which may compress jaws 48 pivoted intermediate their extremities as at 49 upon a suitable bracket 50, each of said jaws being provided with a tooth 51 for engagement with the tire casing. The tail portions 52 of the jaws are connected by a pair of toggle levers 53, the pivot pin 54 of said toggle being slidably mounted in a slot 55 formed in the bracket 50, a bell crank lever 56 is connected to the toggle levers by a link 57 and provided with an operating handle 58.

For the purpose of gauging the size of the sample section to be cut from the tire, a rod 60 is longitudinally adjustable through a bore 61 in the collar 38 and is provided at its inner end with a stop finger or plate 62 for engagement with the inner end of the tire. A set screw 63 may be provided in the collar for engagement with the rod 60 to hold the same in the desired longitudinal adjustment.

As best shown in Fig. 3, the collar is provided with the annular groove 64, arranged to be engaged by the spring pressed plunger 65 which is transversely located within the mandrel. The collar is easily placed upon or removed from the mandrel and when in position thereon is held against accidental displacement and the mandrel may freely rotate within the collar which is held against rotation by the tire.

In operating the machine to cut sample sections from a tire casing, the table 39 is adjusted vertically to accommodate the size of casing to be cut, and the proper size collar 38 is placed upon the mandrel 36. The tire casing, which of course must first be severed to receive the collar of the mandrel, is then placed upon the table, the open end thereof being placed over the collar of the mandrel.

The clamping jaws 48 are then operated by means of the lever 56, the teeth 51 engaging opposite sides of the tire and holding it rigid upon the table. It is, of course, understood that the end of the tire casing is extended the desired distance over the mandrel to secure the size of sample section required.

The treadle 9 is then depressed, sliding the clutch 6 into engagement with the drive gear 4 and through the pinion 11, rotating the large gear 12 upon which the cutting disks 35 are carried.

The operator then grasps the hand wheel 2, holding the same against rotation, thus holding the pinion 23 against movement and causing the screws 25, through the bevel gear 24 to be rotated in a direction to draw the cutting disks 35 toward each other. As the cutting disks thus rotate around the tire casing, and move toward each other, sample sections will be cleanly and accurately cut from the tire.

I claim:—

1. A tire cutter including a table arranged to support the tire to be cut, a guide block rotatably mounted adjacent to the table, a pair of cutting disks slidably mounted upon the guide block, a mandrel concentrically mounted upon the guide block and adapted to be inserted into the open end of the tire, a collar rotatably mounted upon the mandrel and arranged to engage the inner surface of the tire, a pair of screws for automatically moving the cutting disks toward each other as they are rotated, a normally rotating shaft operatively connected to the screws, and means for holding said shaft against rotation to operate the screws.

2. A tire cutter including a table arranged to support the tire to be cut, a guide block rotatably mounted adjacent to the table, a pair of cutting disks slidably mounted upon the guide block, a mandrel concentrically mounted upon the guide block and adapted to be inserted into the open end of the tire, a pair of screws for automatically moving the cutting disks toward each other as they are rotated, bevel gears upon said screws, a shaft having a bevel pinion meshing with said gears, and means for holding said shaft against rotation to operate the screws.

3. A tire cutter including a table arranged to support the tire to be cut, a guide block rotatably mounted adjacent to the table, a pair of cutting disks slidably mounted upon the guide block, a mandrel concentrically mounted upon the guide block and adapted to be inserted into the open end of the tire and means for automatically moving the cutting disks toward each other as they are rotated, and a collar rotatably mounted upon the mandrel and arranged to engage the inner surface of the tire.

4. A tire cutter including a table arranged to support the tire to be cut, a guide block rotatably mounted adjacent to the table, a pair of cutting disks slidably mounted upon the guide block, a mandrel concentrically mounted upon the guide block and adapted to be inserted into the open end of the tire, a pair of screws for automatically moving the cutting disks toward each other as they are rotated, a normal rotating shaft operatively connected to the screws and means for holding said shaft against rotation to operate the screws.

FRANK H. GROVE.